(12) United States Patent
Chen

(10) Patent No.: US 8,294,673 B2
(45) Date of Patent: Oct. 23, 2012

(54) INPUT DEVICE THAT ADJUSTS ITS OPERATION MODE ACCORDING TO ITS OPERATION DIRECTION AND A CONTROL METHOD THEREOF

(75) Inventor: Er-Hao Chen, Taipei County (TW)

(73) Assignees: Silitek Electronic (Guangzhou) Co., Ltd., Guangzhou (CN); Lite-On Technology Corporation, Taipei (TW)

( * ) Notice: Subject to any disclaimer, the term of this patent is extended or adjusted under 35 U.S.C. 154(b) by 664 days.

(21) Appl. No.: 12/463,454

(22) Filed: May 11, 2009

(65) Prior Publication Data

US 2010/0182238 A1    Jul. 22, 2010

(30) Foreign Application Priority Data

Jan. 22, 2009    (CN) .......................... 2009 1 0037019

(51) Int. Cl.
*G09G 5/08* (2006.01)
(52) U.S. Cl. ...................................................... 345/166
(58) Field of Classification Search ........... 345/163–166
See application file for complete search history.

(56) References Cited

U.S. PATENT DOCUMENTS

2005/0231472 A1* 10/2005 Gordon et al. ................ 345/157
2008/0015031 A1*  1/2008 Koizumi et al. ................ 463/43
* cited by examiner

*Primary Examiner* — Kevin M Nguyen
(74) *Attorney, Agent, or Firm* — Li & Cai Intellectual Property (USA) Office

(57) ABSTRACT

An input device that adjusts its operation mode according to operation directions includes a movement sensing module, an operation direction control unit, a micro-control unit, and a transmission module. The movement sensing module for sensing a plurality of reflection images relative to a light source that is reflected by a reflection surface. Furthermore the movement sensing module obtains a movement displacement amount and a movement direction of the input device according to pattern variations between the reflection images. The operation direction control unit provides an operation direction of the movement sensing module. The micro-control unit converts the movement direction sensed by the movement sensing module according to the operation direction of the movement sensing module. The transmission module transmits the movement displacement amount and the converted movement direction of the input device to a host terminal so as to control a cursor displayed on the host terminal.

8 Claims, 6 Drawing Sheets

INPUT DEVICE THAT ADJUSTS ITS OPERATION MODE ACCORDING TO ITS OPERATION DIRECTION AND A CONTROL METHOD THEREOF

BACKGROUND OF THE INVENTION

1. Field of the Invention

The present invention relates to an input device that adjusts its operation mode according to its operation direction; in particular, the present invention relates to an input device that can be operated in different directions.

2. Description of Related Art

An input device with an optical sensing module, such as a mouse, can only be placed and moved on a flat surface, such as a desk surface. For example, when a speaker is giving a presentation with image projection, the image projection is controlled for broadcast by a mouse placed on a podium. However, in order to make the audiences see the speaker clearly, sometimes there is no podium. Therefore, the speaker will not have a desk surface to perform a complex operation (such as displaying an application program), and the operation have to be performed by an assistant. For a situation like this, the assistant has to cooperate with the speaker well. If the speaker and the assistant lack adequate cooperation, the image projection will not match the speech content. Although the speaker can perform a simple operation by a remoter, the speaker still needs a tool that can perform a complex operation. Therefore, an input device (such as an optical mouse) that can be operated by the speaker in a three-dimensional space is required.

If a traditional optical mouse is directly operated in the three-dimensional space, then the traditional optical mouse will not work due to the distance between the mouse and the ground, since the distance for reflecting the light beam is too far. In consideration of the aforementioned issue that the distance for reflecting the light beam may be too far, the optical mouse can be turned upwards so that the light sensing module and the light source operation direction are turned upwards and the fingers may replace the desk surface or ground surface as the reflection surface. However, when the optical mouse is turned and held via hand, the operation direction of the finger is opposite to the moving direction of the cursor on the display screen. The optical mouse therefore cannot be smoothly operated. If the optical mouse is designed for being used in the three-dimensional space, the optical mouse can be smoothly operated. However, the user has to buy two kinds of optical mice. It is inconvenient for the user to carry them and also buying two kinds of optical mice means that the fee increases.

Since an input device capable for the user to carry and operate anywhere in the representation is becoming more necessary, an input device that can be operated on a surface (such as desk surface) and also be held in hand and operated in the three-dimensional space is required.

SUMMARY OF THE INVENTION

One particular aspect of the present invention is to provide an input device that adjusts its operation mode according to its operation direction. Therein, the operation mode of the input device is changed according to its operation direction so that the input device can be operated on a surface or in the three-dimensional space.

The input device that adjusts its operation mode according to its operation direction includes a movement sensing module, an operation direction control unit, a micro-control unit, and a transmission module. The movement sensing module senses a plurality of reflection images relative to a light source that is reflected by a reflection surface; furthermore the movement sensing module obtains a movement displacement amount and a movement direction of the input device according to pattern variations between the reflection images sensed. The operation direction control unit provides an operation direction to the movement sensing module. The micro-control unit converts the movement direction sensed by the movement sensing module according to the operation direction provided by the operation direction control unit. The transmission module transmits the movement displacement amount and the converted movement direction of the input device to a host terminal so as to control a cursor displayed on the host terminal, allowing the cursor to move according to the movement displacement amount and the converted movement direction.

The present invention also provides a control method of the input device that adjusts its operation mode according to its operation direction, and includes the following steps. A plurality of reflection images relative to a light source which is reflected by a reflection surface are obtained. A movement displacement amount and a movement direction of the input device are sensed according to pattern variations between the reflection images. Further, an operation direction of the input device is provided. The sensed movement direction is converted according to the operation direction of the input device. Finally, the movement displacement amount and the converted movement direction are transmitted to a host terminal so as to control a cursor displayed on the host terminal.

By utilizing one movement sensing module and a light source module included therein, the input device can be smoothly operated in different operation directions and since the light source module is included within the movement sensing module so that some space is conserved for the input device. Additionally, manufacturing cost and the power consumption of the input device are reduced.

For further understanding of the present invention, reference is made to the following detailed description illustrating the embodiments and examples of the present invention. The description is for illustrative purpose only and is not intended to limit the scope of the claim.

DETAILED DESCRIPTION OF THE PREFERRED EMBODIMENTS

The present invention provides an input device that adjusts its operation mode according to its operation direction. By identifying the operation direction via a movement sensing module that includes a light source, the input device can change its operation mode (such as the relation between the operation direction and the movement direction of the cursor) for different operation directions (such as a surface or a three-dimensional space) and exactly controls the movement of a cursor displayed on the host terminal by using the same movement sensing module.

The operation direction of the present invention is the direction of the movement sensing module, wherein the movement sensing module includes a light source module for emitting a light source (e.g. light beam) to a reflection surface. The operation direction includes the following two conditions. When the input device is placed above the reflection surface, the movement sensing module that includes the light source then keeps emitting a light beam downwards to the reflection surface and sensing a plurality of reflection images reflected by the surface. At this time, the operation direction of the input device is downward, such as the direction of an optical mouse being generally operated on a desk surface. When the input device is placed below the reflection surface, the movement sensing module that includes the light source then keeps emitting a light source upwards to the reflection surface and sensing a plurality of reflection images reflected by the surface. At this time, the operation direction of the input device is upward, which is the direction of an optical mouse having been turned and so that the optical mouse is now operated by a finger.

Figure 1:
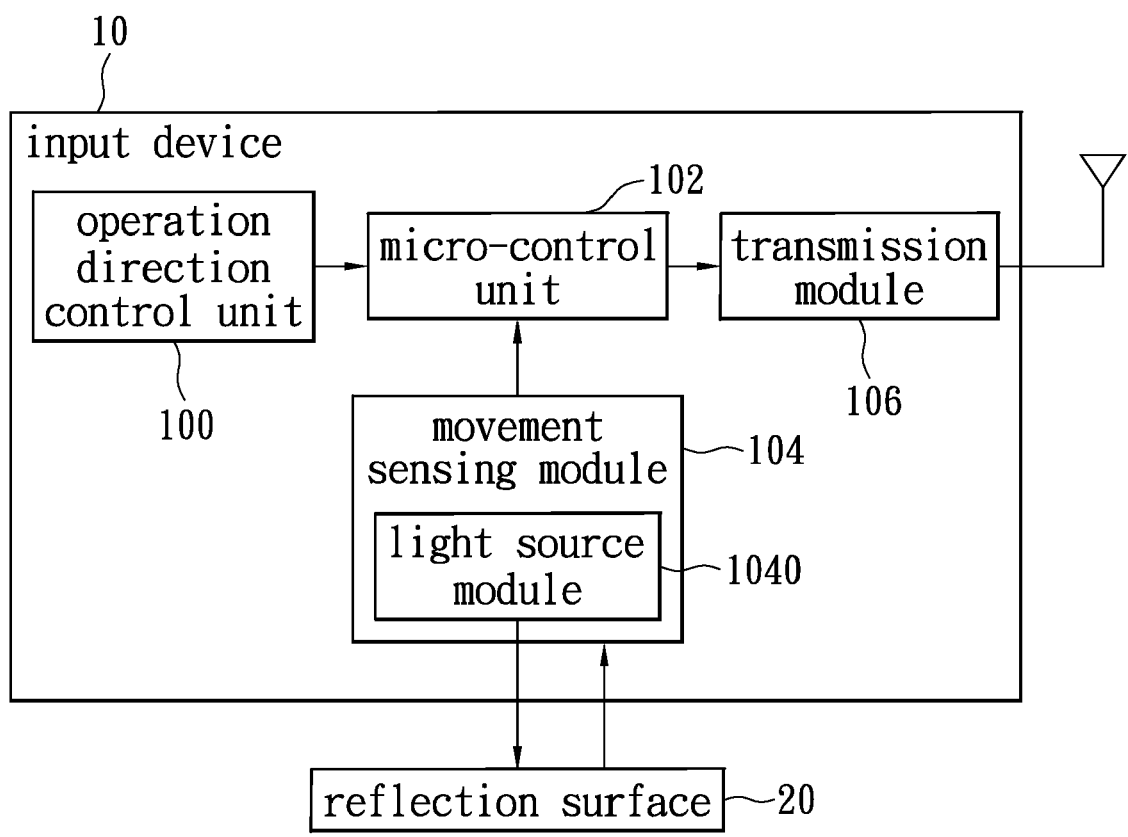
FIG. 1 is a block diagram of a first embodiment of the present invention, which shows an input device that adjusts its operation mode according to its operation direction.

FIG. 1 is a block diagram of a first embodiment of the present invention, which shows an input device that adjusts its operation mode according to its operation direction. The input device 10 includes an operation direction control unit 100, a micro-control unit 102, a movement sensing module 104, and a transmission module 106. The movement sensing module 104 includes a light source module 1040.

The light source module 1040 of the movement sensing module 104 emits a light beam from the input device 10 to the reflection surface 20 so as to generate a plurality of reflection images, and the reflection images are sensed by the movement sensing module 104. As the input device 10 is moving, the movement sensing module 104 continuously senses the reflection images, and calculates the movement displacement amount and the movement direction of the input device 10 according to pattern variations between the plurality of reflection images. Take an optical sensing module located within in an optical input device as an example, therein the optical sensing module (such as an LED) emits a red light beam to the reflection surface 20. The image sensor (such as CMOS) in the optical sensing module scans and obtains a plurality of reflection images so as to obtain the movement displacement amount and the movement direction of the input device 10. If the optical sensing module further includes a digital signal processor (DSP), the DSP can be used for calculating the movement displacement amount and the movement direction to obtain the relation between the movement of the input device 10 and the cursor displacements ($\Delta x$ and $\Delta y$) of the host terminal, and controls the two-dimensional coordinates (x, y) of the cursor displacements of the host terminal.

The operation direction control unit 100 is used for providing the operation direction of the movement sensing module 104. The micro-control unit 102 determines whether to convert the movement direction sensed by the movement sensing module 104 according to the operation direction, and converts the two-dimensional coordinates relative to the movement displacement amount and the movement direction into an inverted two-dimensional coordinates according to the determination result. The transmission module 106 (such as RF transmission module) transmits the movement displacement amount and the original movement direction (or the converted movement direction) via an antenna. That means the transmission module 106 transmits the two-dimensional coordinates or the inverted two-dimensional coordinates to the host terminal (not shown in the figure) in order to control the movement of a cursor displayed on the host terminal (such as a computer host) according to the transmitted coordinates.

In addition to being generated by the movement sensing module 104 of the DSP, the two-dimensional coordinates (x, y) of the movement of the cursor shown on the host terminal can also be calculated by the micro-control unit 102 after receiving the movement displacement amount and the movement direction transmitted from the movement sensing module 104.

Thereby, the input device 10 can correspondingly convert the movement direction sensed and outputted by the movement sensing module 104 according to the operation direction of the movement sensing module 104 so that the input device 10 can change its operation mode according to different operation directions, thereby making the moving direction of the cursor on the host terminal be kept the same and exact.

For an optical mouse, when the operation direction is the same as that of the optical mouse being operated on a desk surface, the movement direction and the movement displacement amount of the optical mouse match the movement direction and the movement displacement amount of the cursor of the host terminal. The micro-control unit 102 can thus directly provide the movement displacement amount and the original movement direction to the transmission module 106. When the optical mouse is turned over and is held in hand and operated by finger, the movement sensing module 104 detects that the moving direction of the input device 10 is opposite to the operation direction of the finger so that the direction of the cursor displayed on the host terminal is also opposite to the operation direction of the finger. For this operation direction, the movement direction sensed by the movement sensing module 104 has to be converted. When the converted movement direction is transmitted to the host terminal, the moving direction of the cursor can match the operation direction of the finger. The above relation between the movement directions is illustrated in detail by referring to FIGS. 3A-3C.

Figure 2A:
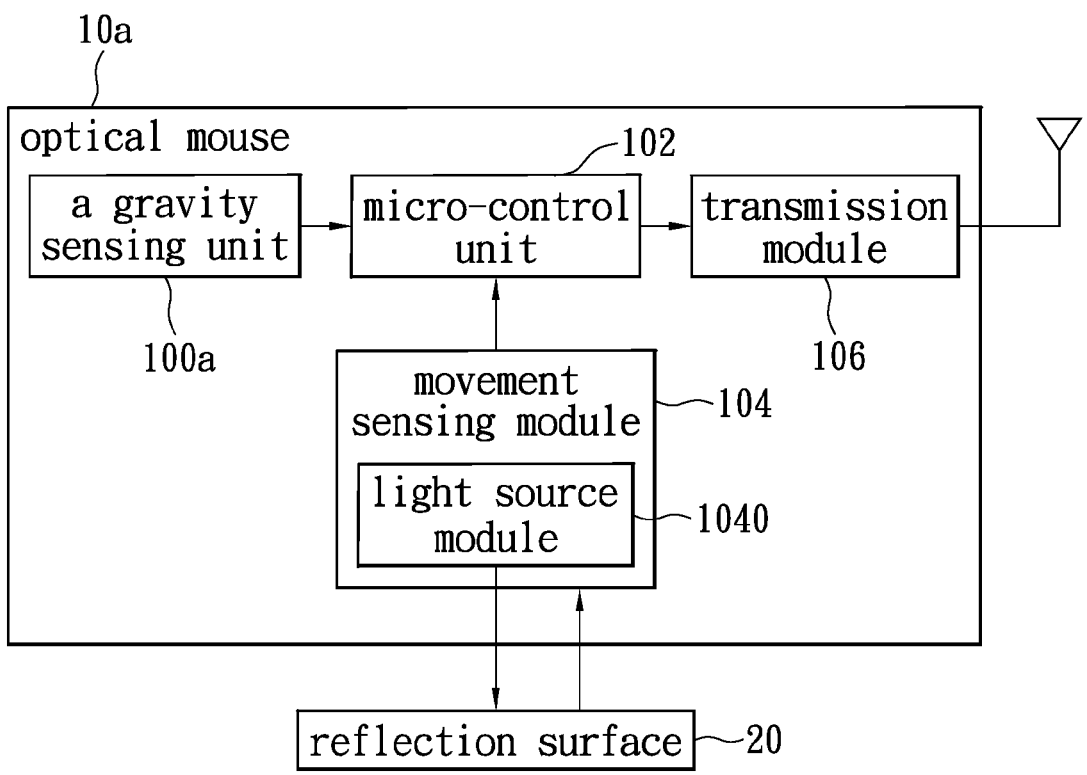
FIG. 2A is a block diagram of a second embodiment of the present invention (with sensing unit), which shows the input device that adjusts its operation mode according to its operation direction.
Figure 2B:
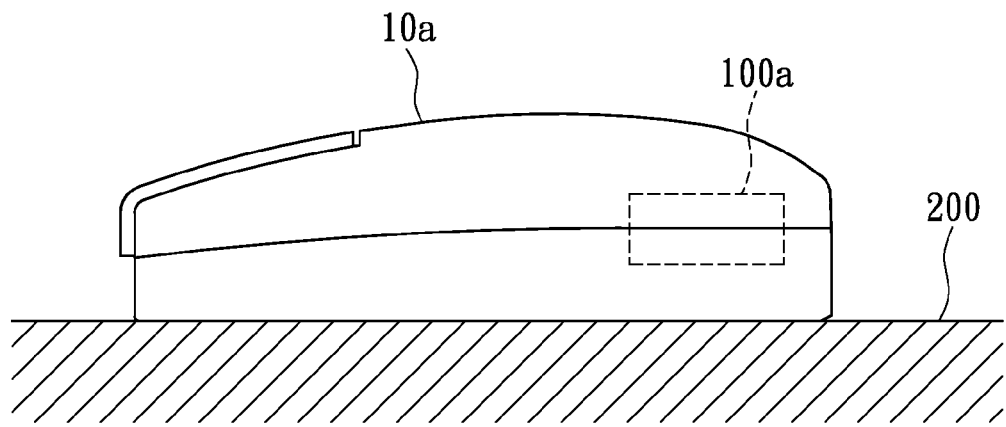
FIG. 2B is a schematic diagram of the input device (with sensing unit) shown in FIG. 2A.

FIG. 2A is a block diagram of a second embodiment of the present invention, which shows the input device that adjusts its operation mode according to its operation direction. In this embodiment, the input device is an optical mouse 10*a*, and includes a micro-control unit 102, a movement sensing module 104, and a transmission module 106. The operation direction control unit 100 is a gravity sensing unit 100*a*.

When the gravity sensing unit 100*a* senses the operation direction of the movement sensing module 104 in the input device 10*a*, the means for sensing can be fore example by a gravity sensor (G sensor), by the rolling status of a steel ball affected according to gravity, or by the flowing status of mercury affected according to gravity. Because the G sensor can simply utilize the change of gravity acceleration to sense that the input device 10*a* is turned over to the left or right direction (i.e. turned over via rotation to the left or right direction) or the front or rear direction (i.e. turned over via rotation to the front or rear direction), and provides the operation direction of the input device 10a. Therefore, in a preferred embodiment, the gravity sensing unit 10a is a G sensor.

In detail, the G sensor is used for detecting the gravity acceleration of three coordinates (x, y, z) in the three-dimensional space when an object is being operated, so as to calculate the motion status and location of the object. Therefore, when the optical mouse 10a is operated on the desk surface or in the three-dimensional space, the G sensor can be used for sensing whether the optical mouse 10a is turned over or not. For example, when the optical mouse 10a has an initial status of being operated on the desk surface, then the G sensor does not detect that the optical mouse 10a on the desk surface is turned over, thereby it is determined that the optical mouse 10a is in a normal horizontal status. At this time, the operation direction of the optical mouse 10a is that the movement sensing module 104 and the light source module 1040 face downwards to the reflection surface 20. When the optical mouse 10a is turned over, the G sensor detects that the location and the rotation angle of the optical mouse 10a change because there is a gravity acceleration generated. Therefore, if the optical mouse 10a is turned over due to rotation of left-right direction or due to rotation of front-rear direction to be in an upward horizontal status, then the optical mouse 10a is located in an inverted horizontal status that is inversed due to rotations in the left-right direction or front-rear direction. The operation direction of the optical mouse 10a at this time is upwards to face the reflection surface 20 and is inversed left-to-right or front-to-rear comparing to in the normal horizontal status.

The G sensor detects the change of the gravity acceleration when the optical mouse 10a is turned over each time, so as to obtain the operation direction of the optical mouse 10a and generate the corresponding control signal. For example, when the operation direction of the optical mouse 10a is downward to face the reflection surface 20, the control signal "00" is generated. When the operation direction of the optical mouse 10a is upward to face the reflection surface 20 and is inversed due to left or right direction of rotation, then the control signal "10" is generated. When the operation direction of the optical mouse 10a is upward to face the reflection surface 20 and is inversed due to front or rear direction of rotation, then the control signal "01" is generated.

Figure 3A:
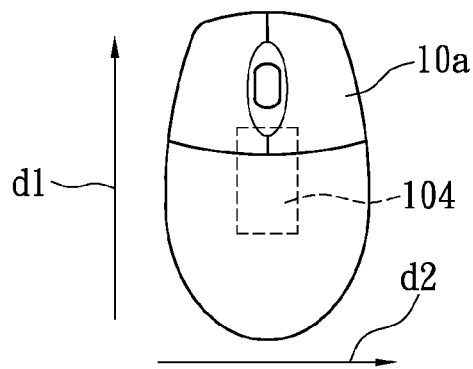
FIG. 3A-3C are schematic diagrams of the placement status and movement direction of the input device that adjusts its operation mode according to its operation direction.
Figure 3B:
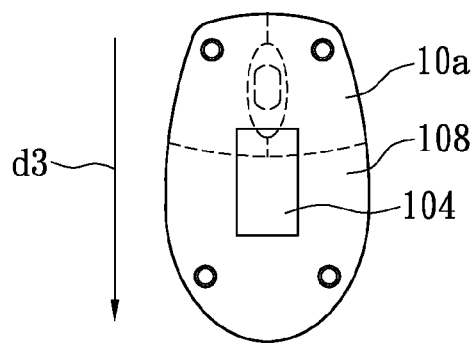
Figure 3C:
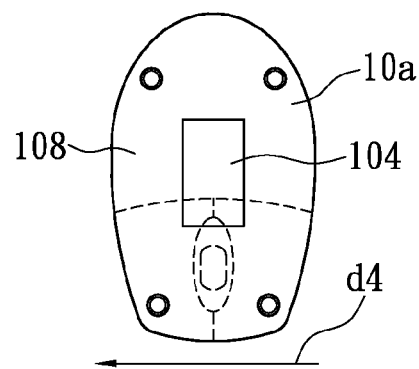

FIGS. 3A-3C respectively represents a disposition status and a moving direction in accordance with the disposition status of an optical mouse 10a, which is an example of the input device 10. The micro-control unit 102 receives the control signal that represents the operation direction to determine whether or not to convert the movement direction transmitted by the movement sensing module 104. As shown in FIG. 3A, the G sensor detects that the optical mouse 10a is in the normal horizontal status and generates the corresponding control signal "00". When the micro-control unit 102 receives this signal, it determines that the two-dimensional coordinates (x, y) does not need to be converted. The two-dimensional coordinates (x, y) is directly transmitted to the transmission module 106, and then is transmitted to the host terminal by an operation signal.

When the G sensor detects that the optical mouse 10a is turned over to be located in an inverted horizontal status, as shown in FIGS. 3B and 3C, then the corresponding control signal, such as "10", is generated. After the micro-control unit 102 receives the movement displacement amount, the movement direction, and the control signal "10", the two-dimensional coordinates (x, y) relative to the movement displacement amount and the movement direction is converted to an inverted two-dimensional coordinates (x, −y) and then is transmitted to the host terminal. For another instance, when the control signal is "01", the two-dimensional coordinates (x, y) is converted to an inverted two-dimensional coordinates (−x, y).

The reason for converting the two-dimensional coordinates to an inverted two-dimensional coordinates is described as below. When the optical mouse 10a is turned over, the movement sensing module 104 and the light source module 1040 is inversed to the original reflection surface (such as the desk surface 200). At this time, other kinds of reflection surfaces 20 can be used for reflecting the image, such as the operator's finger. The operator moves the finger to simulate the movement displacement amount and the movement direction of the optical mouse 10a being placed and moved on the desk. However, due to the moving direction of the finger for operating the optical mouse 10a is opposite to the direction of the optical mouse 10a being moved on the desk surface 200, the moving direction of the optical mouse 10a being turned over and operated by the finger is opposite to the moving direction of the cursor of the host terminal. Therefore, the two-dimensional coordinates (x, y) generated from the movement sensing module 104 by detecting the reflection images from the finger has to be converted so that the moving direction of the cursor displayed on the host terminal consists with the direction of the optical mouse 10a being placed and operated on the desk surface 200.

Reference is made to FIG. 3A. When the optical mouse 10a is operated in a normal status (in a normal horizontal status), the movement sensing module 104 and the light source module 1040 face the desk surface 200. When the optical mouse 10a moves in the direction of forward d1 or the direction of right d2, the cursor on the host terminal also moves forward or right according the received two-dimensional coordinates (x, y). On the other hand, when the optical mouse 10a is turned over via rotation to the left or right direction, so that the optical mouse 10a changes from the status shown in FIG. 3A to be positioned as the status shown in FIG. 3B (in an inverted horizontal status due to left-right direction rotations) and is operated by fingers, then the optical mouse 10a moves in the direction of backward d3 when the fingers moves forward. In other words, when the optical mouse 10a is turned over, then at this time the finger acts as the reflection surface and operates to control the optical mouse 10a, and the movement direction of the optical mouse 10a relative to the fingers are opposite in direction. Therefore, when the two-dimensional coordinates is not converted, the cursor shown on the host terminal moves downward when the fingers moves forward. Therefore, when the optical mouse 10a is turned due to rotations in the left-right direction to be in an inverted horizontal status, then the two-dimensional coordinates (x, y) for controlling the movement of the cursor of the host terminal has to be converted into two-dimensional coordinates (x, −y); thereby, the cursor of the host terminal can move in the same direction as the operator's fingers moving on the optical mouse 10a, instead of being in opposite direction. In other words, when the input device is turned over due to rotation in the left or right direction, then the micro-control unit 102 converts the coordinate value that controls the cursor of the host terminal to move upwards or downwards into its additive inverse value.

Similarly, when the optical mouse 10a is turned over via rotation to the front or rear direction, so that the optical mouse 10a changes from the status shown in FIG. 3A to be positioned as the status shown in FIG. 3C (the inverted horizontal status due to front-rear direction rotations) and the fingers pushes to the right direction, then the optical mouse 10a moves in the direction of left d4 so that the movement of the cursor on the host terminal is in the left-right inversed status. Therefore, in order to match the movement of the cursor with the finger's operation, the micro-control unit 102 converts the two-dimensional coordinates (x, y) for controlling the movement of the cursor of the host terminal into the inverted two-dimensional coordinates (-x, y). In other words, when the input device is turned over due to rotation in the front or rear direction, then the micro-control unit 102 converts the coordinate value that controls the cursor of the host terminal to move left or right into its additive inverse value.

By using the above embodiment, the G sensor is used for detecting whether or not the optical mouse 10a is turned over, so as to obtain the operation direction of the optical mouse 10a and generate a control signal that corresponds to the operation direction. Thereby, the micro-control unit 102 performs the coordinate converting operation to the two-dimensional coordinates according to the control signal. When the optical mouse 10a is operated on the desk surface 200 or is turned over and operated by finger, the movement of the cursor of the host terminal is exact. The optical mouse 10a can simply utilizes a single movement sensing module 104 to achieve the effect that the optical mouse 10a can be exactly operated in different operations.

In addition to a G sensor for detecting the acceleration of a moving object, the gravity sensing unit 100a can be a mercury switch for detecting whether or not the optical mouse 10a is turned over. The mercury switch includes a receiving space for receiving liquid mercury with trace quantity, wherein the mercury can flow towards the lower position within the receiving space due to gravity. Furthermore one end of the receiving space of the mercury switch includes two electrodes, so that when mercury flows towards one end of the receiving space with the electrodes, then the circuit loop is conducted due to the two electrodes conducted through mercury at the same time. When the mercury flows to the other end of the receiving space that is without electrodes, then the circuit loop is not conducted and is open. Therefore, when the operation direction of the optical mouse 10a is normal horizontal, the circuit loop of mercury is open. When the optical mouse 10a is turned over then the circuit loop is closed. Thereby the mercury switch generates a control signal and the micro-control unit 102 converts the two-dimensional coordinates according to the control signal. So that, when the operator operates the optical mouse 10a by a finger, the converted coordinate value is inputted to the host terminal, and its operation direction result for the optical mouse 10a would appear the same as the operation direction result for the optical mouse 10a has not been turned over.

Figure 4A:
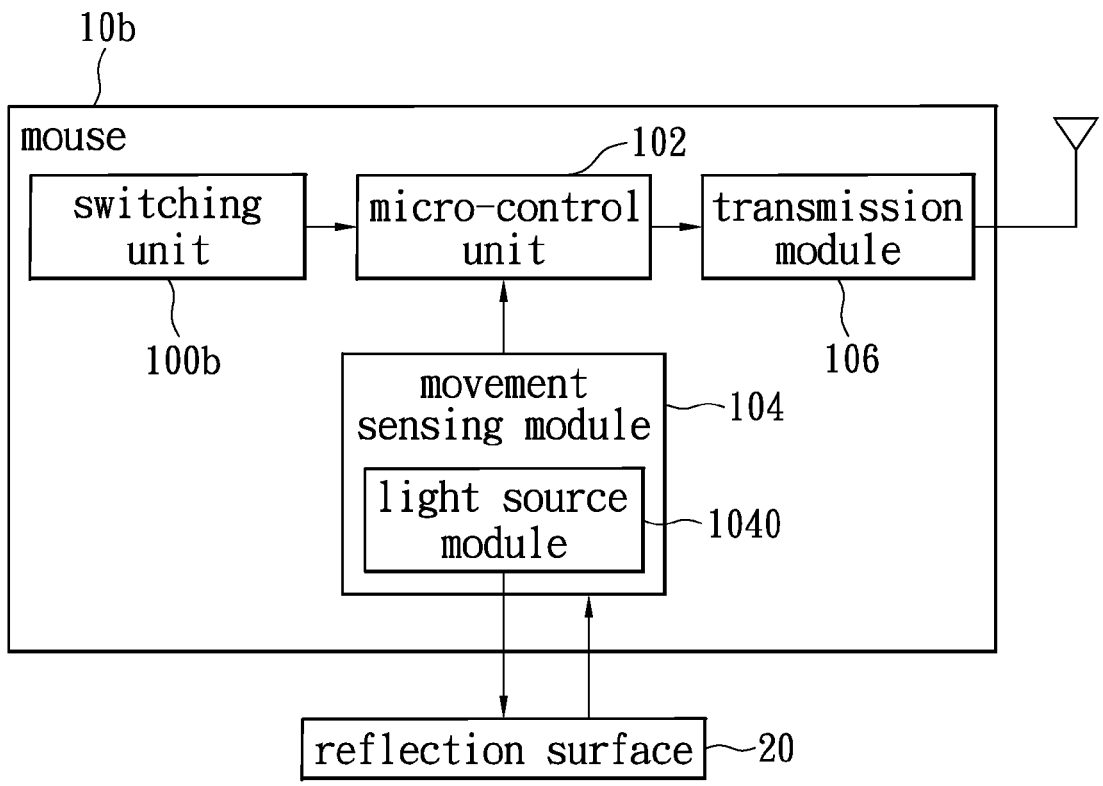
FIG. 4A is a block diagram of a third embodiment of the present invention (with switching unit), which shows the input device that adjusts its operation mode according to its operation directions.
Figure 4B:
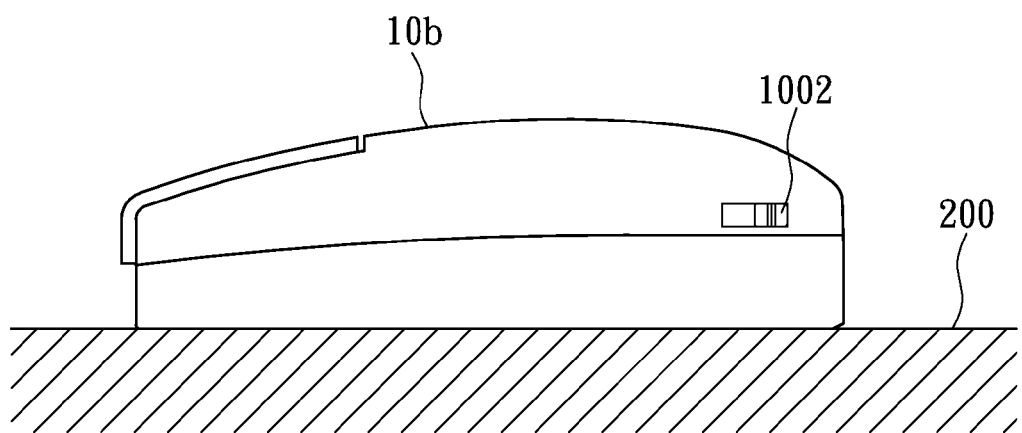
FIG. 4B is a schematic diagram of the input device (with switching unit) shown in FIG. 4A.

FIG. 4A is a block diagram of a third embodiment of the present invention, which shows the input device that adjusts its operation mode according to its operation direction. Reference is also made to FIG. 4B. In this embodiment, the input device 10 is a mouse 10b, and includes a micro-control unit 102, a movement sensing module 104, and a transmission module 106. In this embodiment, the operation direction control unit 100 is a switching unit 10b, such as switching switch 1002 (referring to FIG. 4B). When the operator operates the switching switch 1002, the switching switch 1002 generates a control signal for representing the operation direction when the switch status of the switching switch 1002 is changed. After the switch status of the switching switch 1002 changes, the movement direction sensed and outputted by the movement sensing module 104 is converted by the micro-control unit 102. At this time, the operator turns over the mouse 10b and back to the reflection surface 20 (the desk surface 200) and uses the finger to replace the desk surface 200 and as the reflection surface 20 for reflecting the light source. The movement sensing module 104 senses the pattern variations of the reflection images generated by the movement of the finger. The other technology has been described in the previous embodiment, and thus shall not be repeated.

Figure 5:
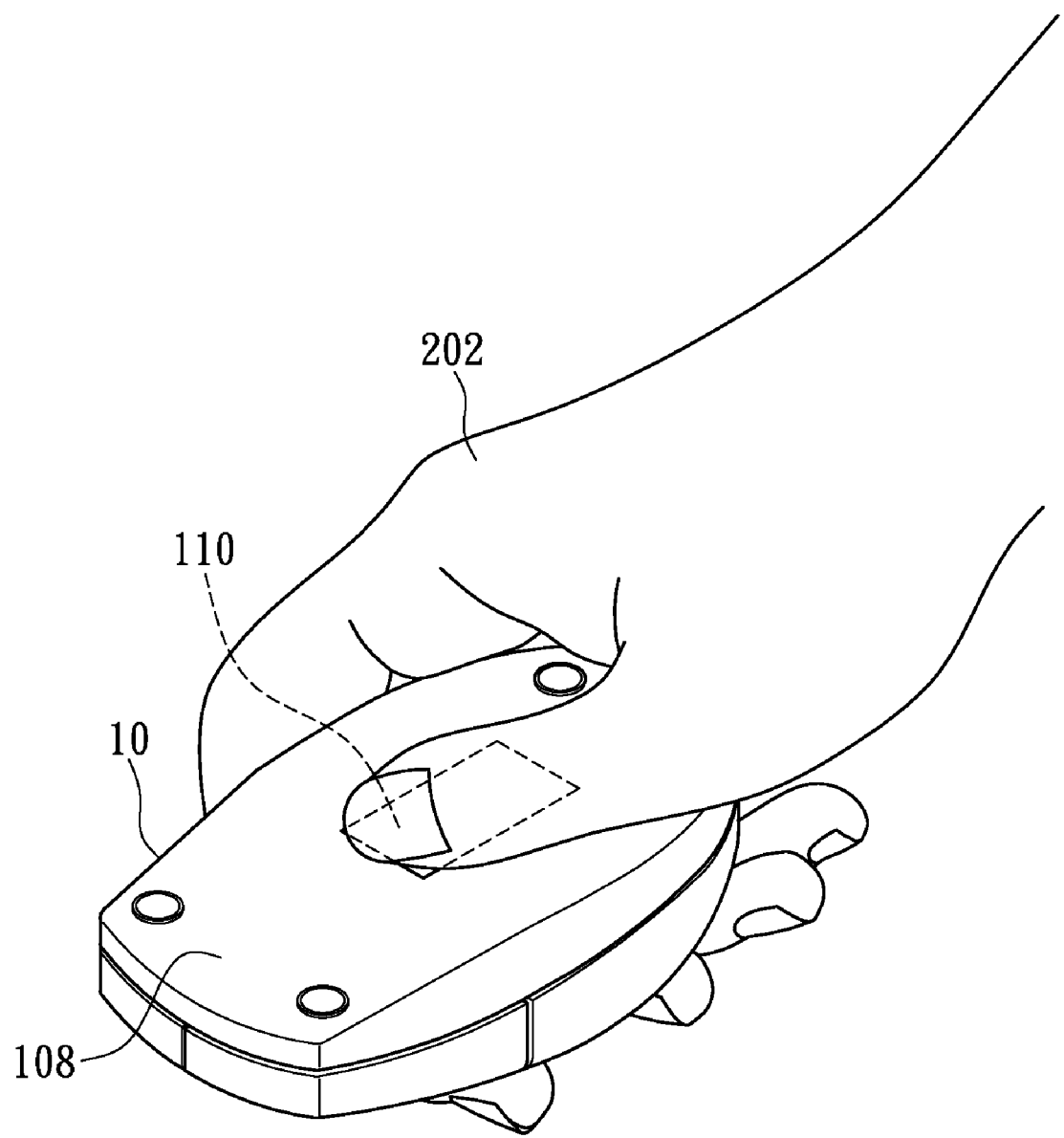
FIG. 5 is a schematic diagram of the of the input device operated by finger of the present invention.

Reference is made to FIG. 5A. Because the input device 10 uses the desk surface 200 or a mouse pad to reflect the light source and the reflection surface is a plane, the problem of the movement displacement amount being not exactly detected due to light beam refraction would not occur when the light source emits on the reflection surface from the bottom surface 108 of the input device 10. However, when the mouse 10b is operated by the finger 202, the finger 202 is an arc and may be deform so that it is not a plane. In order to prevent the movement displacement amount from being not exactly detected by the movement sensing module 104 due to light beam refraction, there is a plate light-transparent cover body 110 on the bottom surface 108 of the input device 10 for being contacted by the finger 202. The light source passes through the plate light-transparent cover body 110 and is reflected from the finger 202 that is not pervious to light so that the movement sensing module 104 can exactly detects the reflection images from the finger 202 and the plate light-transparent cover body 110, so as to output the exact movement displacement amount and the movement direction for the micro-control unit 102 to process.

Figure 6:
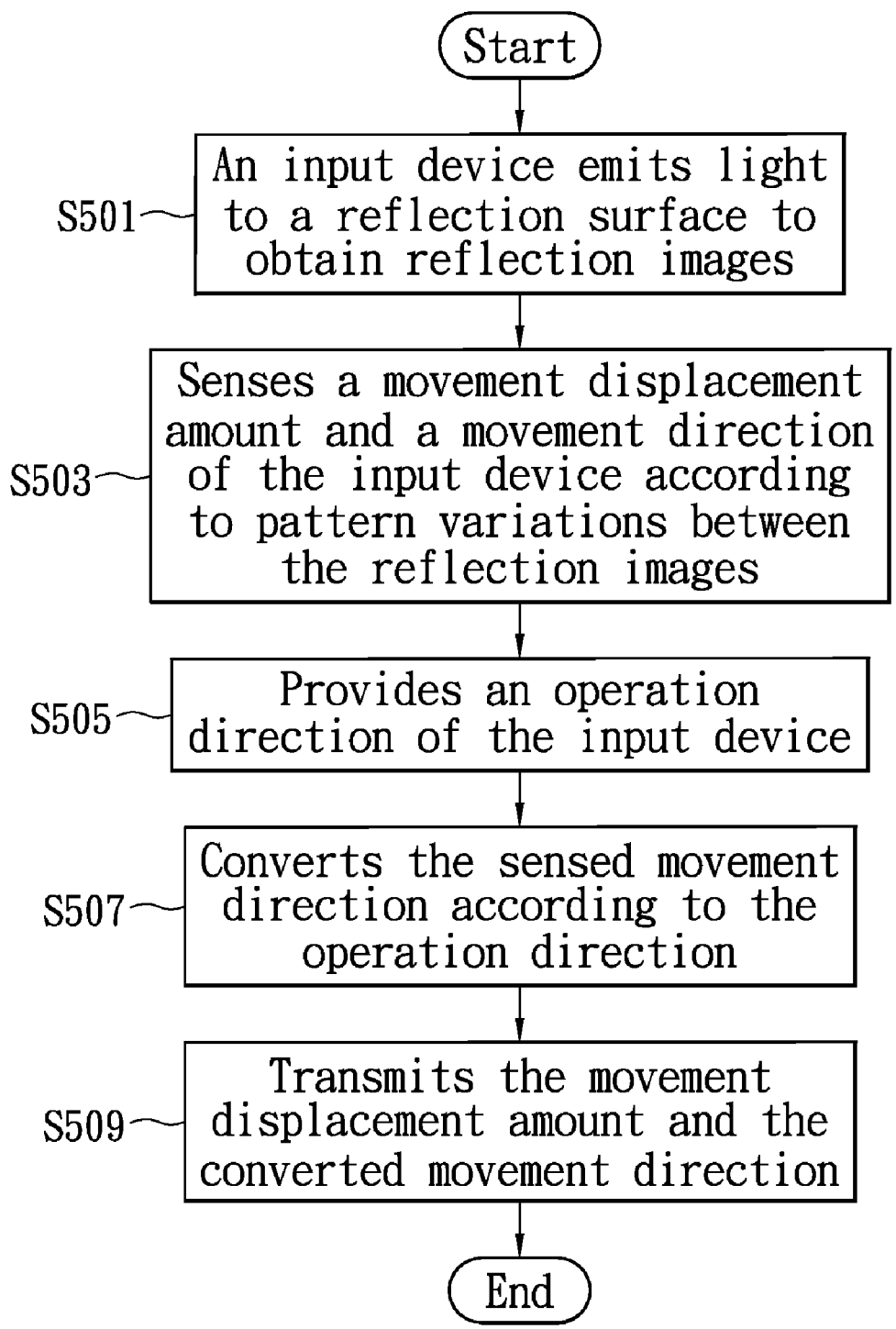
FIG. 6 is a flow chart of the control method for the input device that adjusts its operation mode according to its operation direction.

FIG. 6 is a flow chart of the control method for the input device that adjusts its operation mode according to its operation direction. The control method for the input device that adjusts its operation mode according to its operation direction includes the following steps. A light source module 1040 of the input device 10 emits a light source to a reflection surface 20 so as to generate a plurality of reflection images which are sensed by the movement sensing module 104 (S501). The movement sensing module 104 senses a movement displacement amount and a movement direction of the input device 10 according to pattern variations between the sensed reflection images (S503). An operation direction control unit 100 provides an operation direction of the movement sensing module 104 of the input device 10 (S505). The micro-control unit 102 converts the movement direction according to the operation direction (S507). Finally, the transmission module 106 transmits the movement displacement amount and the converted movement direction to a host terminal (S509) so as to control the cursor displayed on the host terminal to move according to the movement displacement amount and the converted movement direction.

A two-dimensional coordinates is generated according to the movement displacement amount and the movement direction sensed by the movement sensing module 104. The micro-control unit 102 determines whether or not to convert the movement direction according to the operation of the movement sensing module 104 of the input device 10. When the movement direction needs to be converted, the micro-control unit 102 converts the movement direction. One coordinate value of the two-dimensional coordinates is converted into its own inverse value.

The operation direction control unit 100 can detect whether or not the input device 10 is turned over, or on the other hand the switch control may be utilized to provide the operation direction of the input device 10. When the sensing means is adopted, the operation direction control unit 100 is a gravity sensing unit 100a so as to sense whether or not the input device 10 is turned over and to obtain the operation direction of the input device 10, such as in the normal horizontal status, or in the inverse horizontal status. A control signal is generated according to the operation direction so that the micro-control unit 102 coverts the two-dimensional coordinates by using the control signal.

In one embodiment, the gravity sensing unit 100a is a G sensor. The G sensor can sense the operation direction of the inverted horizontal of the input device 10 according to the change of the gravity acceleration caused by the input device 10 being turned over in different directions, and outputs the corresponding control signal to make the micro-control unit 102 convert the two-dimensional coordinates. For example, When the mouse 10a is turned over in the left-right direction to change its operation direction, the control signal outputted from the G sensor will indicate the micro-control unit 102 to convert the two-dimensional coordinates (x, y) into the inverted two-dimensional coordinates (x, −y). When the mouse 10a is turned over in the front-rear direction to change its operation direction, the two-dimensional coordinates (x, y) is converted into another inverted two-dimensional coordinates (−x, y) so that the moving direction of the cursor of the host terminal matches the direction of the operation of the finger 202. The method and the reason of the conversion are referred to in FIGS. 3A-3C, and is not repeated again.

When the switching means is used, the operation direction control unit 100 can be a switching unit 100b, such as a switching switch. The operator changes the switch status of the switching switch 1002, so that a control signal for representing the operation direction may be generated according to the switch status of the switching switch 1002, and the control signal is transmitted to the micro-control unit 102. Thereby, the micro-control unit 102 converts the two-dimensional coordinates into an inverted two-dimensional coordinates according to the control signal. The implementation process is also referred to in FIGS. 4A and 4B.

The input device that adjusts its operation mode according to its operation direction and the control method thereof of the present invention can use a single movement sensing module to sense the movement of the input device in different operation mode and provide the different operation mode of the input device. Thereby, the input device (especially for a mouse) can be operated on the desk surface or be held by hand in the three-dimensional space, for correspondingly input the exact movement displacement amount and the movement direction to the host terminal. It is convenient for the operator to operate the input device, which is not limited to a specific space. Furthermore, the input device can be easily integrated with other functions. Moreover, by using the single movement sensing module that includes a light source to detect the different operation mode, the required space for the input device is reduced due to no second sensing module is required and the power consumption and the manufacturing cost of the input device are also reduced.

The description above only illustrates specific embodiments and examples of the present invention. For example, the transmission module of the input device is not limited to a radio RF transmission, and it can be a wireless or a wired transmission. The present invention should therefore cover various modifications and variations made to the herein-described structure and operations of the present invention, provided they fall within the scope of the present invention as defined in the following appended claims.

What is claimed is:

1. An input device that adjusts its operation mode according to its operation direction, comprising:
   a movement sensing module, for sensing a plurality of reflection images relative to a light source that is reflected by a reflection surface and sensing a movement displacement amount and a movement direction of the input device according to pattern variations between the plurality of reflection images, wherein a two-dimensional coordinate is generated based upon the movement displacement amount and the movement direction;
   an operation direction control unit for providing an operation direction of the movement sensing module;
   a micro-control unit for determining whether or not to convert the movement direction according to the operation direction provided by the operation direction control unit, wherein when the movement direction is determined to be converted the micro-control unit converts the two-dimensional coordinate into an inverted two-dimensional coordinate by converting one of coordinate values of the two-dimensional coordinate into an additive inverse value; and
   a transmission module for transmitting the two-dimensional coordinate or the inverted two-dimensional coordinate of the input device to a host terminal so as to control a cursor displayed on the host terminal based on the two-dimensional coordinate or the inverted two-dimensional coordinate.

2. The input device as claimed in claim 1, wherein the operation direction control unit is a gravity sensing unit, the gravity sensing unit senses a variation of the gravity when the input device is turned over to provide the corresponding operation direction.

3. The input device as claimed in claim 2, wherein when the gravity sensing unit senses that the input device is turned over, the gravity sensing unit generates the operation direction to make the micro-control unit to convert the two-dimensional coordinate into the inverted two-dimensional coordinate.

4. The input device as claimed in claim 3, wherein when the input device is turned over in a left or right direction, the micro-control unit converts the coordinate value relative to the left or right direction into the additive inverse value, wherein the coordinate value is used to control the cursor displayed on the host terminal.

5. The input device as claimed in claim 3, wherein when the input device is turned over in a front or rear direction, the micro-control unit converts the coordinate value relative to the front or rear direction into the additive inverse value, wherein the coordinate value is used to control the cursor displayed on the host terminal.

6. A control method of an input device that adjusts its operation mode according to its operation direction, comprising:
   sensing a plurality of reflection images relative to a light source that is reflected by a reflection surface;
   sensing a movement displacement amount and a movement direction of the input device according to pattern variations between the plurality of reflection images, wherein a two-dimensional coordinate is generated based upon the movement displacement amount and the movement direction;
   providing an operation direction of the input device;
   determining whether or not to convert the movement direction according to the operation direction;
   converting the two-dimensional coordinate into an inverted two-dimensional coordinate by converting one of coordinate values of the two-dimensional coordinate into an additive inverse value when the movement direction is determined to be converted; and
   transmitting the two-dimensional coordinate or the inverted two-dimensional coordinate of the input device to a host terminal, so as to control a cursor displayed on the host terminal based on the two-dimensional coordinate or the inverted two-dimensional coordinate.

7. The control method as claimed in claim 6, wherein converting one coordinate value of the two-dimensional coordinate into the additive inverse value further comprises:
   when the input device is turned over in a left or right direction, the coordinate value relative to the left or right direction is converted into the additive inverse value; and
   when the input device is turned over in a front or rear direction, the coordinate value relative to the front or rear direction is converted into the additive inverse value.

8. The control method as claimed in claim 6, further comprising before providing the operation direction:
   sensing whether the input device is turned over, so as to determine the operation direction of the input device.

* * * * *